No. 860,753. PATENTED JULY 23, 1907.
E. F. LLOYD.
GAS SCRUBBER.
APPLICATION FILED JUNE 22, 1906.
2 SHEETS—SHEET 2.
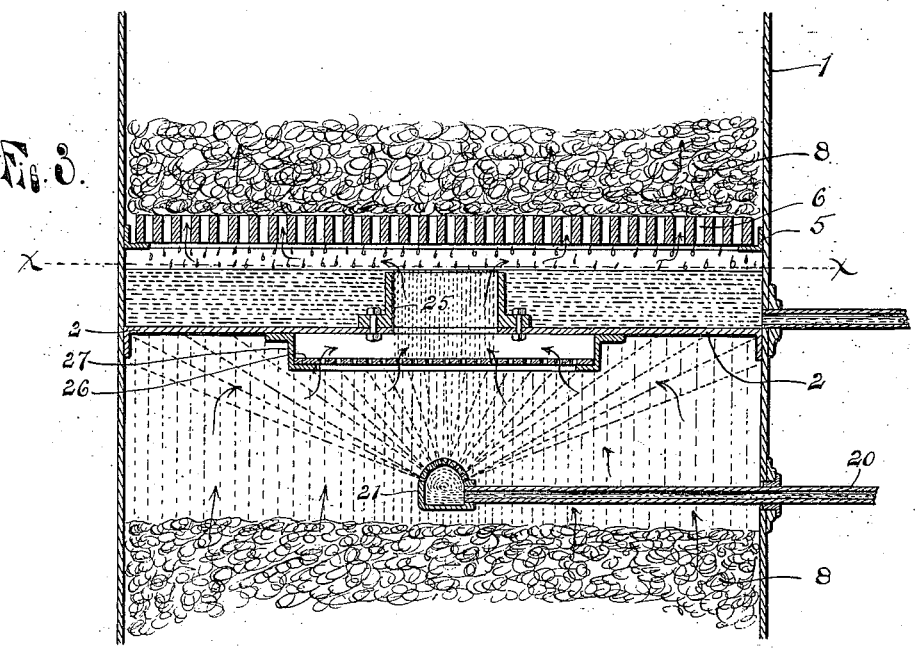
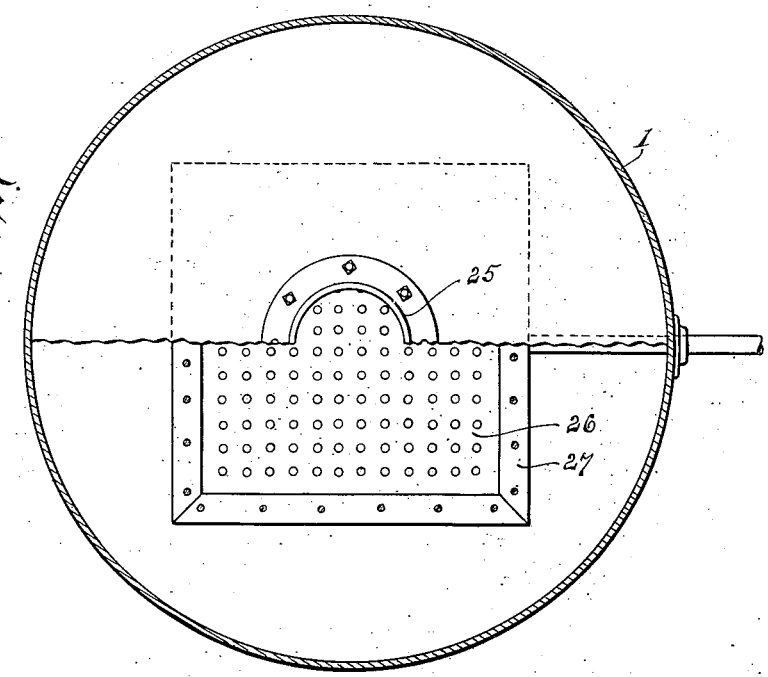
WITNESSES:    INVENTOR.
              Ernest F. Lloyd
              BY
              ATTORNEYS.

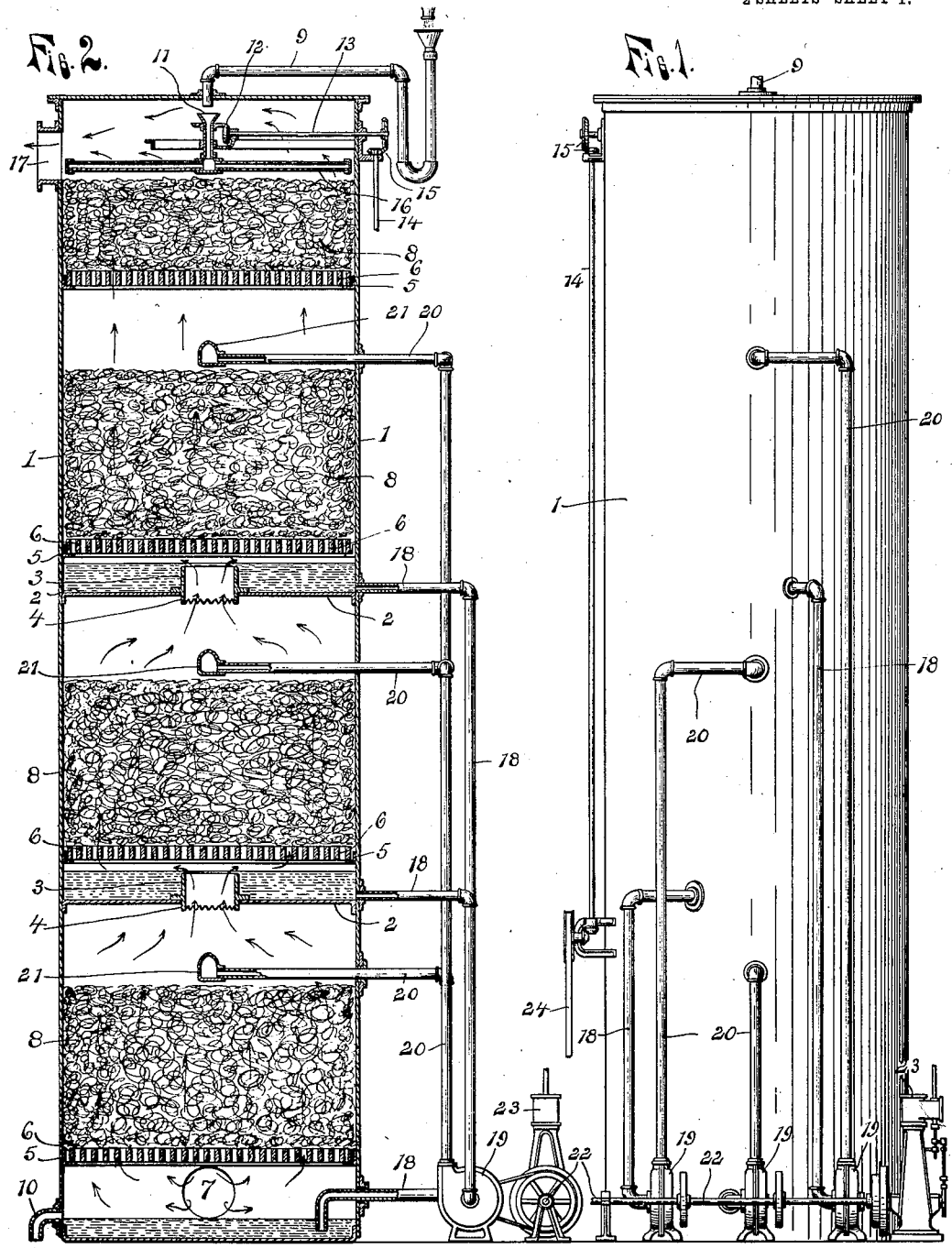

UNITED STATES PATENT OFFICE.

ERNEST F. LLOYD, OF DETROIT, MICHIGAN.

GAS-SCRUBBER.

No. 860,753.

Specification of Letters Patent.

Patented July 23, 1907.

Application filed June 22, 1906. Serial No. 322,819.

*To all whom it may concern:*

Be it known that I, ERNEST F. LLOYD, a citizen of the United States of America, residing at Detroit, in the county of Wayne and State of Michigan, have invented certain new and useful Improvements in Gas-Scrubbers, of which the following is a specification, reference being had therein to the accompanying drawings.

This invention relates to improvements in apparatus commonly known as gas scrubbers for removing ammonia, carbonaceous matter, sulfurous compounds, etc., from gas, and which acts through the affinity of ammonia for water.

The various valuable constituents of the gas as well as ammonia, have a strong affinity for fresh water and therefore when water is used in any great quantity, the gas is deteriorated by being robbed of these valuable elements and the resulting ammoniacal liquor is very weak, requiring an expensive distillation process to make it marketable.

The prime object of this invention is, therefore, to effect the removal of all of the ammonia from the gas with the use of a minimum amount of water and to provide an apparatus for the purpose, the construction of which is such as to obviate the necessity of making the device of excessive height and thus expensive and inconvenient to operate and house.

A further object of the invention is to provide a simple construction which may be easily cleaned and refilled and which requires but little power to operate, the device also having the several advantages of the particular construction, arrangement, and combination of parts, all as hereinafter more fully described, reference being had to the accompanying drawings, in which Figure 1, is a side elevation of a device embodying the invention; Fig. 2, a vertical section of the same; Fig. 3, is an enlarged vertical section showing a modified construction; and Fig. 4, a horizontal section on the line $x-x$ of Fig. 3 with a portion of the bottom broken away to show the perforated plate below.

As shown in the drawings 1 is a vertical cylindrical shell divided into a series of chambers by water tight bottom partitions 2, each having an axial opening into which is fitted an overflow thimble or pipe 3 extending upward within the bottom of one chamber a short distance to maintain the ammoniacal liquor therein at the height of said thimble and projecting downward a very short distance into the top of the chamber below, said downwardly projecting edge 4 being serrated to assist in breaking up the stream of gas as it flows from the lower to the upper chamber.

Just above the upper end of each of the two thimbles is removably supported by an angle iron ledge 5 on the outer wall, a grid 6 formed of transverse slats and a similar grid is provided in the upper chamber near its upper end, and another in the bottom chamber just above a gas inlet opening 7 in the side wall of said chamber. Upon each of these grids is a quantity of light porous material 8 such as coke, excelsior, or other suitable material through which the gas may pass freely and in passing be divided and brought into contact with the water contained in said material, which water is introduced into the upper end of the casing or column by a supply pipe 9 and working down through the material to the bottom of the upper chamber, overflows through the thimble in said bottom and so passes on down the column to the bottom thereof where it is carried off through a pipe 10. Upon entering, the water passes into the open funnel shaped end of a vertical pipe 11 supported in a suitable bearing and adapted to be revolved therein by a bevel gear 12 on said pipe in mesh with a similar gear on the end of a shaft 13 extending outward through a bearing in the side wall of the chamber and receiving motion from a vertical shaft 14 connected thereto by bevel gears 15. On the lower end of this vertical pipe is a transverse perforated pipe 16 into which the water passes from the vertical pipe and from which it escapes through the perforations therein as the pipe is revolved, and is distributed evenly over the surface of the scrubbing material 8 below. Opening through the side of the chamber above said material is a gas outlet 17.

In order that the scrubbing material below that which is wetted by the rotary sprinkler may be kept thoroughly saturated without the necessity of introducing large quantities of water, a draw-off pipe 18 leads from the bottom of each chamber to a suitable pump 19 and the liquor thus drawn from said bottom is forced by said pump through a pipe 20 leading into the same chamber above the scrubbing material therein and is sprayed through a nozzle 21 on said pipe at the axis of the chamber, upward in a flaring spray against the bottom of the chamber above upon which bottom it collects in drops and falls vertically downward upon the scrubbing material. There is preferably a separate pump for each chamber so that the liquor in each chamber will be kept separate from that in the other chambers, it being of varying strength in the different chambers, and these pumps are all driven from a common driving shaft 22 by means of pulleys and belts, or otherwise, said shaft being driven by any suitable engine or motor 23. The vertical shaft 14 for actuating the rotary sprinkler is also driven in any suitable manner as by a belt 24 from the engine or driving shaft.

In Figs. 3 and 4 a construction is shown in which the thimble 3 is dispensed with and an overflow flange 25 secured to the upper side of the bottom around the opening, and a rectangular perforated plate 26 is supported beneath the opening in the bottom at a distance below the same by a rectangular frame 27 formed of angle iron secured to the underside of the bottom. The liquor sprayed from the nozzle below strikes this plate and the gas in passing through the perforations therein is divided into thin streams and is brought into contact with the liquor adhering to the plate.

The ammonia laden gas enters the bottom section of the column through the inlet opening 7 and in passing upward through the grid and scrubbing material in this section is thoroughly diffused and brought into contact with the ammoniacal liquor which is constantly passing downward through said material. In passing upward it is brought to the center of the chamber in order to pass through the axial opening in the bottom, and thus passes across and through the spray issuing from the nozzle and also through the down-pouring drops falling from said bottom. In passing upward through the sections above, the gas is subjected to the same treatment, and finally passes through the thin bed of scrubbing material at the top of the column which is saturated with fresh water, and thus, by reason of the strong affinity of the ammonia for fresh water, all traces of ammonia are removed from the gas. In this construction only a small quantity of fresh water is required and as the gas passes through the ammoniacal liquor contained in the different chambers, so many times, by the time it reaches the bottom of the column it will contain a large percentage of ammonia.

Having thus fully described the invention, what I claim is:—

1. In a gas scrubber, the combination with a casing formed with a series of chambers each having an axial opening in its bottom and means for maintaining a height of liquor in the bottom of each chamber, of a bed of scrubbing material in each chamber, a pipe leading from the bottom of each chamber, a pipe extending into each chamber above the scrubbing material therein and provided with a nozzle at the axis of the chamber, adapted to direct a spray upward and a perforated plate supported in each chamber above the nozzle at a distance below the opening in the bottom of the chamber above and having a greater area than the area of said opening.

2. In a gas scrubber, the combination of a vertically extending cylindrical casing having a gas inlet at its lower end and a gas outlet at its upper end and divided into a series of chambers by bottom walls each having an axial opening, an overflow pipe for each of said openings, a grid in each chamber above the overflow, a bed of scrubbing material upon each of said grids, a series of pumps, a pipe leading from the bottom of each chamber to a pump and a pipe leading from each pump into each chamber above the bed of material therein, a rotary sprinkler supported in the upper end of the upper chamber, a water supply pipe to supply water to said sprinkler, a motor, a driving shaft actuated by the motor, means for transmitting motion from said driving shaft to actuate the pump, a vertical shaft, a horizontal shaft extending into the casing and geared to the sprinkler and vertical shaft, and means for transmitting motion from the driving shaft to the vertical shaft.

In testimony whereof I affix my signature in presence of two witnesses.

ERNEST F. LLOYD.

Witnesses:
OTTO F. BARTHEL,
CHAS. B. SHUMWAY.